G. KANTER.
PNEUMATIC VEHICLE WHEEL.
APPLICATION FILED OCT. 19, 1911.

1,036,855.

Patented Aug. 27, 1912.

2 SHEETS—SHEET 1.

Inventor:
Gustav Kanter

G. KANTER.
PNEUMATIC VEHICLE WHEEL.
APPLICATION FILED OCT. 19, 1911.
1,036,855.
Patented Aug. 27, 1912.
2 SHEETS—SHEET 2.
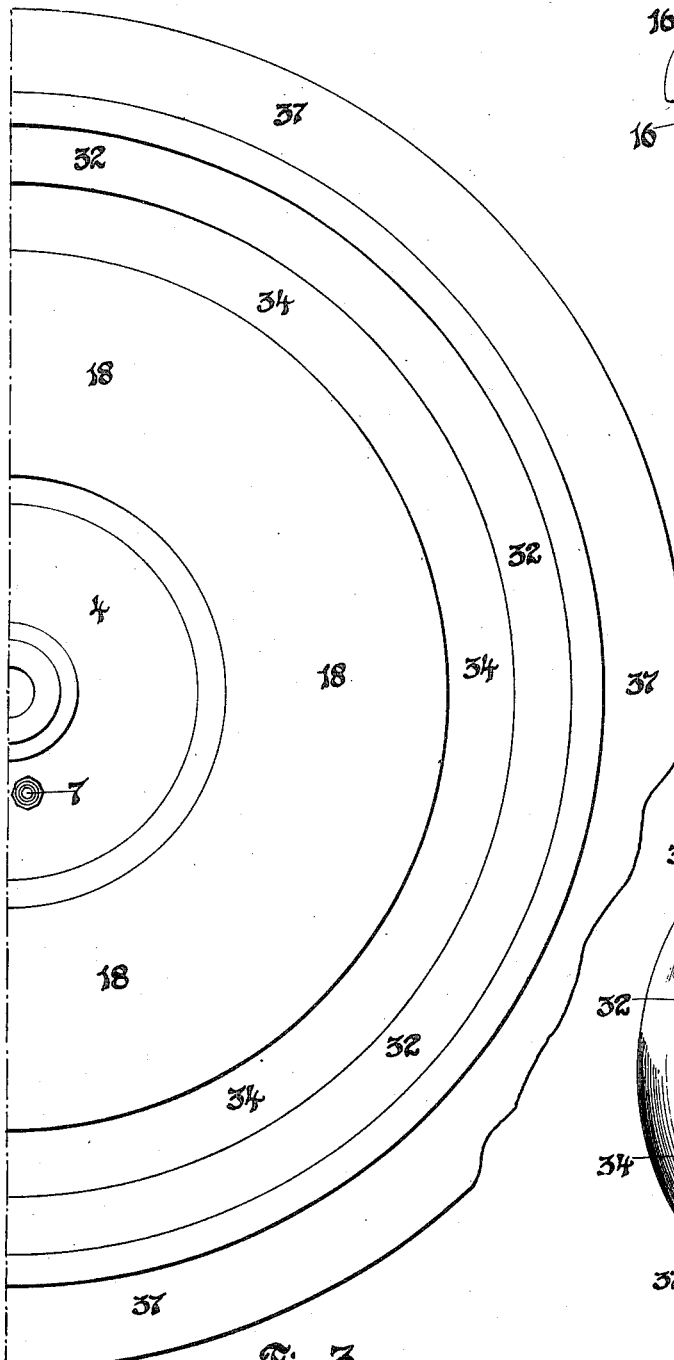
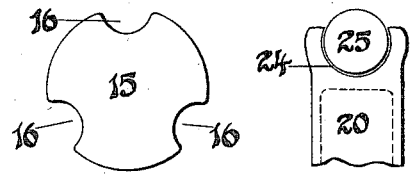
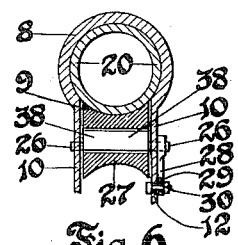
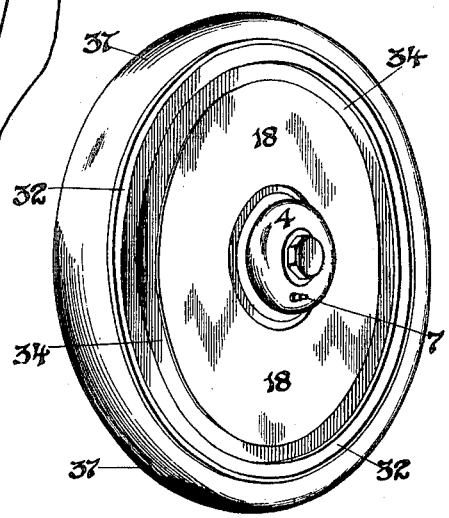

UNITED STATES PATENT OFFICE.

GUSTAV KANTER, OF MURTOA, VICTORIA, AUSTRALIA.

PNEUMATIC VEHICLE-WHEEL.

1,036,855.   Specification of Letters Patent.   Patented Aug. 27, 1912.

Application filed October 19, 1911. Serial No. 655,555.

*To all whom it may concern:*

Be it known that I, GUSTAV KANTER, a subject of the Emperor of Germany and King of Prussia, and a resident of Hamilton street, in the post-town of Murtoa, in the county of Borung, State of Victoria, Commonwealth of Australia, have invented certain new and useful Improvements in Pneumatic Vehicle-Wheels, of which the following is a specification.

This invention relates to that type of vehicle wheel dispensing with the pneumatic tire and providing a pneumatic support by means of spokes consisting of cylinders and pistons adapted to coöperate upon the wheel meeting an obstruction or inequality in the road surface.

Hitherto a common form of wheel proposed has consisted of a series of pistons radiating from the hub with a corresponding number of cylinders attached to and projecting inwardly from the rim, but rough road surfaces, skidding and side slips when the wheel has been rotating at a rapid velocity have generally had very detrimental effects upon such devices.

The object of the present invention is to provide a wheel of the piston spoke class, particularly applicable to motor cars, which will be reliable and positive in action, which will always provide a pneumatic resistance to shocks, which consists of but few underangeable parts and which will be cheap in construction and easily treated for repair or renewal.

With this invention unequal surfaces upon which the wheel is bearing, side slips and skidding do not have the detrimental effect formerly suffered, a feature of the invention being, a floating rim which is not connected to either cylinders or pistons but so constructed as to be directly driven solely by compressed air behind the pistons with which the said rim is in frictional engagement only and therefore immune from disruption.

Figure 1:
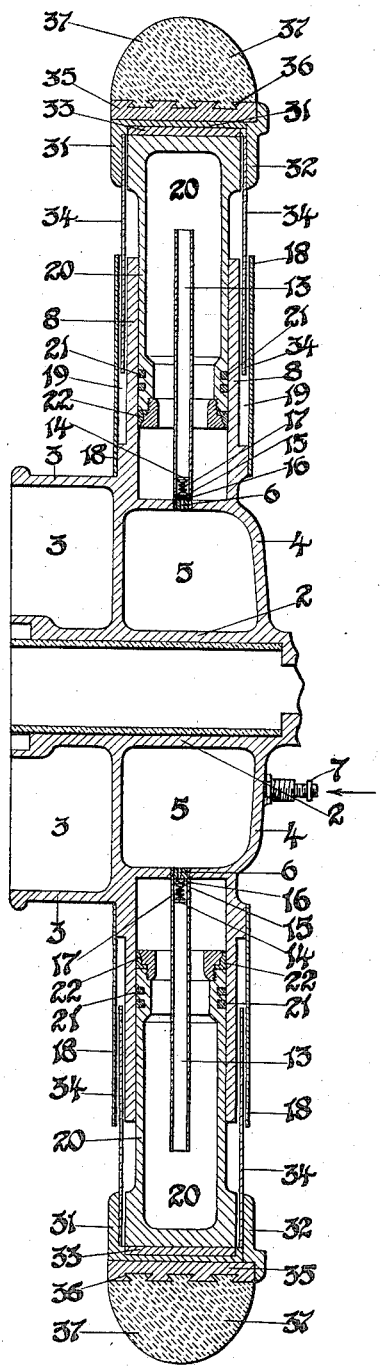
Figure 2:
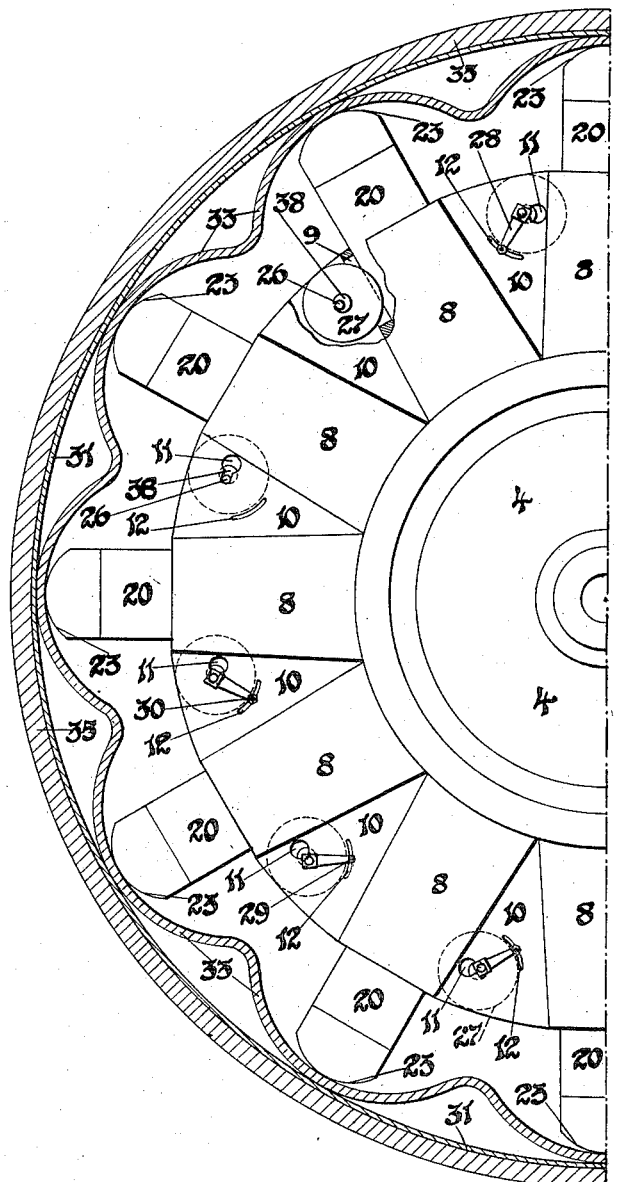

Referring to the drawings which form a part of this specification:—Figure 1 is a vertical sectional view of this invention. Fig. 2 is a side view partly in section of one half of a wheel according to this invention, parts being removed or omitted for convenience of illustration. Fig. 3 is an exterior side view of one half of a wheel according to this invention. Fig. 4 is a plan of a disk valve on an enlarged scale. Fig. 5 is a view of the outer end of a piston equipped with a roller. Fig. 6 is a sectional plan view of a thrust roller, showing its relationship to a piston and cylinder. Fig. 7 is a perspective view of a wheel complete.

This invention includes (Fig. 1) a wheel having an axle sleeve 2 integral with which may be a brake flange 3. Integral with the sleeve 2 is a hub 4. Within the hub is an annular compressed air chamber 5 having a series of air outlet orifices 6. Protruding from the hub is a main air inlet valve 7.

Integral with the hub are a series of radiating cylinders 8 each having a closed inner end and an open outer end. In each cylinder (Fig. 2) near its outer end and at the driving side of the same, is a hole or roller passage 9. Extending between and uniting the cylinders (Figs. 2 and 6) are two webs 10 having spaces therebetween. In each web, adjoining the driving side of each cylinder, is a bearing slot 11 having an enlarged portion or hole to pass an eccentric on an eccentric shaft hereinafter referred to, and also having a shaft bed to accommodate the said shaft. In either of said webs is also a segmental slot 12.

Centrally disposed within each cylinder (Fig. 1) is an air delivery tube 13. The inner end of each of these tubes surrounds an air orifice 6. Extending across each air delivery tube is a spring retainer 14. Within each tube 13 and covering each air orifice 6 is (Fig. 4) a non-return disk valve 15 having in its periphery a plurality of gullets 16. Between each valve 15 and the spring retainer 14 above it is a spiral spring 17.

At each side of the cylinders 8 is an outer circumferential plate 18. Between the plates 18, and the sides of the cylinders are sliding spaces 19.

Within each cylinder is a hollow piston 20 having a closed outer end and an open inner end. Each piston is provided with spring piston rings 21 and a cup leather 22 at its inner end. The outer end of each piston (Fig. 2) is rounded or curved as at 23. Or each piston outer end may be provided (Fig. 5) with a roller bed 24 accommodating a friction roller 25.

Accommodated (Figs. 2 and 6) by the bearing slots 11 in the webs 10 aforementioned and extending between the said webs are a series of eccentric shafts 26 one adjoining each cylinder and each provided with an eccentric portion 38. Upon the eccentric portion 38 of each shaft 26 turns a thrust roller 27 having a concave periphery as shown. To place a thrust roller 27 in position it is held between the webs 10 and the eccentric portion 38 of its shaft is passed through the enlarged portion or hole of the bearing slot 11 of one of the webs 10 and through the roller. The shaft 26 is then pushed into the narrower portion or shaft bed of the slot. To one end of each eccentric shaft 26 is secured an adjusting lever 28 having a hole 29 therethrough. Accommodated by the hole 29 of each lever and the relative segmental slot 12 adjoining the same is a holding bolt 30.

With the foregoing (Fig. 1) is used a floating composite rim comprising an inner rim or channel member 31 having a removable flange 32. Secured (Fig. 2) within the inner rim or member 31 is an intermediate rim or segmental pathway 33. This preferably consists of a series of integral segments as shown. Protruding from the inner rim or channel member are two inner circumferential plates 34 accommodated by the sliding spaces 19. Secured to the channel member 31 is also an outer rim 35 having therein a series of dove-tailed grooves 36 retaining a suitable tire 37 to the said rim.

According to this invention the annular chamber 5 is filled with compressed air, through the valve 7, by means of a pump of any suitable character. The air passes through the air orifices 6 lifting the disk valves 15, passing through the gullets 16, and out of the delivery tubes 13 into the pistons and cylinders. There is therefore compressed air between the closed ends of the pistons and the closed ends of the cylinders. Upon an obstruction being met, the composite rim of the wheel becomes eccentric with the hub 4. The pistons affected are then moved within their cylinders 8, the air within the said cylinders and pistons being compressed and providing a pneumatic cushion. The pistons may also ride in the segmental pathway 33, upon the hub and rim becoming eccentric to each other. The driving thrust of the wheel is borne by the thrust rollers 27. To adjust the rollers 27 in relation to the pistons 20 because of wear or the like, the holding bolt 30 relative to the roller affected is loosened and the lever 28 moved causing a partial rotation of the eccentric shaft 26 and moving the roller either to or from the piston as desired. The eccentric shaft is locked in position by means of its holding bolt in the segmental slot 12.

Having now described my invention, what I claim as new and desire to secure by Letters Patent is:—

1. In improvements in pneumatic vehicle wheels, a hub, a series of pistons controlled by compressed air projecting radially from said hub and thrust devices engaging said pistons, in combination with a floating rim having a segmental pathway engaged by said pistons.

2. In improvements in pneumatic vehicle wheels, a hub having therein an annular air chamber provided with a series of air orifices, a series of cylinders projecting from said hub and communicating with said chamber by said orifices, a piston within each cylinder and projecting therefrom, thrust devices engaging said pistons, a floating rim around said projecting pistons and a segmental pathway attached within said rim and engaged by said pistons.

3. In improvements in pneumatic vehicle wheels, a hub having an annular air chamber therein, a series of cylinders projecting from said hub and communicating with said chamber, a piston within each cylinder and projecting therefrom, thrust rollers engaging said pistons, means for adjusting said rollers and a floating rim around said projecting pistons.

4. In improvements in pneumatic vehicle wheels, a hub, an annular air chamber within said hub, a series of cylinders projecting from said hub each having an open outer end and a closed inner end, a piston within each cylinder and projecting therefrom, a curved closed outer end and an open inner end to each said piston, a floating segmental pathway inclosing all of the pistons and engaged by the curved outer ends thereof and thrust devices engaging the pistons.

5. In improvements in pneumatic vehicle wheels, a hub, an annular air chamber within said hub, a series of cylinders projecting from said hub, a piston within each cylinder, and projecting therefrom, a floating rim around said pistons, a thrust roller adjoining each cylinder and engaging the piston therein, an eccentric shaft supporting each thrust roller, and means for turning and locking each eccentric shaft.

6. In improvements in pneumatic vehicle wheels, a hub having an annular compressed air chamber with a series of air outlet orifices therein, a main air inlet valve attached to said hub, a series of cylinders each having a thrust roller passage therein projecting from said hub and communicating with the chamber thereof by said orifices, a valve controlling each orifice, webs extending between said cylinders, eccentric shafts carried by said webs, a piston in each cylinder and projecting therefrom, thrust rollers mounted on said eccentric shafts and accommodated by the passages in said cylinders and engaging the pistons therein, means for turning and locking said eccentric shafts, and a floating composite rim around and engaged by said pistons.

7. In improvements in pneumatic vehicle wheels, a hub having an annular air chamber with a series of air orifices therein, a series of cylinders projecting from said hub and communicating with said chamber by said orifices, webs extending between said cylinders, bearing slots in said webs, segmental slots in said webs, eccentric shafts mounted in said bearing slots, a thrust roller having a concave periphery mounted upon each eccentric shaft, pistons within said cylinders and bearing against said thrust rollers, a lever secured to each eccentric shaft, and holding bolts in said segmental slots and passing through said levers.

8. In improvements in pneumatic vehicle wheels, a hub having an annular air chamber with a series of air orifices therein, two circumferential outer plates attached to said hub, a series of cylinders projecting from said hub between said plates, a series of air delivery tubes projecting from said hub into said cylinders, a series of non-return valves in said tubes and controlling the said air orifices, a hollow piston in each cylinder and protruding therefrom, a curved outer end to each piston, an adjustable thrust roller bearing against each piston, a floating rim around the protruding pistons, two circumferential inner plates attached to said rim and accommodated between the outer plates and the cylinders, and a segmental pathway within said rim and engaged by the curved outer ends of the pistons.

9. In improvements in pneumatic vehicle wheels, a hub having an annular compressed air chamber therein and a series of air outlet orifices leading from said chamber, a main air inlet valve carried by said hub, a series of cylinders projecting from said hub and communicating with said chamber by said orifices, an air delivery tube within each cylinder, non-return valves within said delivery tubes and controlling said air orifices, a hollow piston within each cylinder and protruding therefrom, a friction roller carried by each piston, an adjustable thrust roller bearing against each piston, a floating rim around said pistons, and a segmental pathway within said rim and engaged by said friction rollers.

10. In improvements in pneumatic vehicle wheels, a hub having an annular compressed air chamber therein and a series of air outlet orifices leading from the periphery of said chamber, a series of cylinders open at their outer ends projecting from said hub and communicating with said chamber by said orifices, a roller passage near the outer end of each cylinder, an air delivery tube within each cylinder and encircling the air orifice leading thereto, a non-return valve controlling each orifice, an adjustable thrust roller accommodated by the roller passage in each cylinder, an outer circumferential plate at each side of the cylinders, a hollow piston having an open inner end in each cylinder and having a closed curved outer end projecting therefrom, a floating rim around said projecting pistons, two inner circumferential plates projecting from said rim and accommodated between the outer circumferential plates and the cylinders, and a segmental pathway attached with said rim and engaged by the curved outer ends of the pistons.

In testimony whereof, I affix my signature in presence of two witnesses.

GUSTAV KANTER.

Witnesses:
  Cecil McGlastress,
  George A. M'Ren.